(12) United States Patent
Bin et al.

(10) Patent No.: US 11,890,955 B2
(45) Date of Patent: Feb. 6, 2024

(54) METHOD AND APPARATUS FOR CONTROLLING CHARGING OF ELECTRIC VEHICLE

(71) Applicants: Hyundai Motor Company, Seoul (KR); Kia Corporation, Seoul (KR)

(72) Inventors: Seung Hyeon Bin, Gyeonggi-do (KR); Han Hee Park, Hwaseong-si (KR); Ho Sun Jang, Chungcheongnam-do (KR); Ho Rim Choi, Gyeonggi-do (KR); Tae Il Yoo, Gyeonggi-do (KR); Seong Min Kim, Gyeongsangnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 133 days.

(21) Appl. No.: 17/486,385

(22) Filed: Sep. 27, 2021

(65) Prior Publication Data
US 2022/0185131 A1    Jun. 16, 2022

(30) Foreign Application Priority Data
Dec. 15, 2020   (KR) .......................... 10-2020-0175697

(51) Int. Cl.
*B60L 53/24*   (2019.01)
*B60L 53/22*   (2019.01)
*H02J 7/02*    (2016.01)

(52) U.S. Cl.
CPC .............. *B60L 53/24* (2019.02); *B60L 53/22* (2019.02); *H02J 7/02* (2013.01); *H02J 2207/20* (2020.01)

(58) Field of Classification Search
CPC ......... B60L 2240/525; B60L 2240/529; B60L 3/003; B60L 3/0038; B60L 53/22; B60L 53/24; B60L 53/62; H02J 2207/20; H02J 2310/48; H02J 7/02; H02M 1/0009; H02M 1/14; H02M 1/327; H02M 3/1552; H02M 3/1586; H02M 7/53871; Y02P 20/52
USPC .................................. 318/139, 130, 400.31
See application file for complete search history.

(56) References Cited

U.S. PATENT DOCUMENTS

| 2014/0021888 A1* | 1/2014 | Niwa | ..................... H02P 29/032 |
| | | | 318/139 |
| 2014/0167669 A1* | 6/2014 | Lim | ..................... B60L 3/0061 |
| | | | 324/750.02 |
| 2019/0023136 A1* | 1/2019 | Lee | ..................... H02J 7/0068 |

FOREIGN PATENT DOCUMENTS

| JP | 2019-58034 | * | 4/2019 | ............ H02M 3/156 |
| KR | 20150075652 | * | 7/2015 | ............. G01R 31/36 |

* cited by examiner

*Primary Examiner* — Jorge L Carrasquillo
(74) *Attorney, Agent, or Firm* — Fox Rothschild LLP

(57) ABSTRACT

A charging control method for an electric vehicle is configured to boost a charging voltage by using a motor and an inverter, and includes steps of determining whether a current imbalance control is normally operated based on currents input from the motor to three-phase inputs of the inverter during charging, determining whether a current sensor is deteriorated based on a result of an internal temperature sensing of the inverter when the current imbalance control is in a normal operation, and adjusting a scale of the current sensor to maintain the charging, when a deterioration of the current sensor is detected, as a result of the determination.

20 Claims, 12 Drawing Sheets

METHOD AND APPARATUS FOR CONTROLLING CHARGING OF ELECTRIC VEHICLE

CROSS-REFERENCE TO RELATED APPLICATION

This application claims under 35 U.S.C. § 119(a) the benefit of Korean Patent Application No. 10-2020-0175697, filed in the Korean Intellectual Property Office on Dec. 15, 2020, the entire contents of which are incorporated herein by reference.

BACKGROUND

(a) Technical Field

The present disclosure relates to charging an electric vehicle, more particularly, to a method and apparatus for controlling charging of the electric vehicle capable of maintaining charging by performing a current imbalance control through a sensor scale optimization when a deterioration of a current sensor is detected in the electric vehicle by boosting a charging voltage through a motor and an inverter.

(b) Description of the Related Art

A high voltage battery mounted in an electric vehicle is a high-output, large-capacity battery system for driving a driving motor to drive the electric vehicle.

FIG. 1 (RELATED ART) illustrates various electric vehicle charging methods using a high voltage battery.

As illustrated in reference numeral 1a of FIG. 1, output energy of the high voltage battery is converted to DC/AC by an inverter and then transferred to the driving motor to drive the electric vehicle.

A method of charging the high voltage battery is largely divided into a slow charging method and a rapid charging method.

As illustrated in reference numeral 1b of FIG. 1, the rapid charging method is a method of directly charging the battery with high power through a rapid EVSE (Electric Vehicle Supply Equipment) by using DC power converted from an external charging infrastructure. Currently, rapid charging infrastructures such as 50 kW-500 V/100 A, 100 kW-500 V/200 A, 200 kW-500 V/400 A, and 400 kW-1000 V/400 A classes exist at home and abroad.

In the case of an electric vehicle battery system of 800 V class, when a 1000 V class rapid charging infrastructure is used, there is no problem with using the rapid charging method of the infrastructure as it is, but when a 500 V class rapid charging infrastructure is used, since output voltage of a rapid charger is only up to 500 V (maximum 450 V control considering margin), a boosting process is necessary for power supply. A conventional electric vehicle uses a coil of a motor and a power conversion switch of an inverter to boost voltage, as illustrated in reference numeral 1c of FIG. 1. As such, a method capable of the rapid charging in both 500/1000 V infrastructure may be provided through output control of the motor and the inverter.

A main control unit (MCU) of a conventional power conversion device for step-up charging provides a function of internally controlling current imbalance. The MCU recalculates an actual current through a preset current sensor scale based on a voltage sensed by a current sensor, and then performs a feedback control to follow an MCU recognized current to update a duty of each phase. However, in case of deterioration, it is difficult to control an actual phase current imbalance because the actual current is misrecognized from the beginning of an operation.

SUMMARY

An aspect of the present disclosure provides a charging control method for an electric vehicle and an apparatus therefor.

Another aspect of the present disclosure provides an electric vehicle charging control method capable of preventing in advance an output limitation or a charging interruption due to device overtemperature by preventing further increase in an IGBT temperature due to phase current imbalance, and an apparatus therefor.

Another aspect of the present disclosure provides an electric vehicle charging control method capable of minimizing a difference between an actual current and an MCU recognized current, by determining a deterioration of a current sensor for each phase by using the difference in the IGBT temperature sensing value for each phase, and by changing a scale of the current sensor in real time when the deterioration is determined, and an apparatus therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a charging control method for an electric vehicle that boosts a charging voltage by using a motor and an inverter, includes determining whether a current imbalance control is normally operated based on currents input from the motor to three-phase inputs of the inverter during charging, determining whether a current sensor is deteriorated based on a result of an internal temperature sensing of the inverter when the current imbalance control is in a normal operation, and adjusting a scale of the current sensor to maintain the charging, when a deterioration of the current sensor is detected, as a result of the determination.

In an embodiment, the current sensor may include a three-phase current sensor operating as a U-phase current sensor, a V-phase current sensor, and a W-phase current sensor, and the current imbalance control may be performed based on three-phase currents changed depending on the adjusted scale of the current sensor.

In an embodiment, the determining of whether the current sensor is deteriorated may be determined based on a difference in an IGBT (Insulated Gate Bipolar Transistor) temperature sensing value for each phase.

In an embodiment, the determining of whether the current sensor is deteriorated when the current imbalance control is in the normal operation may include comparing the difference in the IGBT temperature sensing value for each phase with a predetermined reference value to identify a current sensor in which the deterioration has occurred and a deterioration case.

In an embodiment, the scale of the current sensor may be adjusted upward or downward based on the identified deterioration case.

In an embodiment, two IGBTs may be included for each phase, and the reference value may be applied differently to the two IGBTs.

In an embodiment, reference values for the two IGBTs may have different signs depending on the deterioration case.

In an embodiment, the reference value may be determined in consideration of at least one of a load condition, a temperature sensor position deviation, a temperature sensing error, or a current sensor sensing error.

In an embodiment, the scale adjustment of the current sensor may be performed with respect to a phase corresponding to the current sensor in which the deterioration has occurred.

In an embodiment, the method may further include determining that the current sensor is in the normal operation and maintaining the charging, when the deterioration of the current sensor is not detected, as the result of the determination.

According to another aspect of the present disclosure, a charging control apparatus for an electric vehicle that boosts a charging voltage by using a motor and an inverter, includes a sensing device that senses an internal temperature of the inverter and currents input from the motor to three-phase inputs of the inverter, a deterioration determiner that determines whether a current imbalance control is normally operated based on the current sensing result during charging, and determines whether a current sensor is deteriorated based on the temperature sensing result when the current imbalance control is in a normal operation, and a sensor scale optimizer that adjusts a scale of the current sensor when a deterioration of the current sensor is detected, as a result of the determination.

In an embodiment, the current sensor may include a three-phase current sensor operating as a U-phase current sensor, a V-phase current sensor, and a W-phase current sensor, and the apparatus may further include a three-phase current imbalance controller configured to perform the current imbalance control based on three-phase currents changed depending on the adjusted scale of the current sensor.

In an embodiment, the deterioration determiner may determine whether the current sensor is deteriorated based on a difference in an IGBT (Insulated Gate Bipolar Transistor) temperature sensing value for each phase, which is received from the sensing device.

In an embodiment, the deterioration determiner may compare the difference in the IGBT temperature sensing value for each phase with a predetermined reference value when the current imbalance control is in the normal operation to identify a current sensor in which the deterioration has occurred and a deterioration case.

In an embodiment, the sensor scale optimizer may adjust the scale of the current sensor upward or downward based on the identified deterioration case.

In an embodiment, two IGBTs may be included for each phase, and the reference value may be applied differently to the two IGBTs.

In an embodiment, reference values for the two IGBTs may have different signs depending on the deterioration case.

In an embodiment, the reference value may be determined in consideration of at least one of a load condition, a temperature sensor position deviation, a temperature sensing error, or a current sensor sensing error.

In an embodiment, the sensor scale optimizer may adjust the scale of the current sensor with respect to a phase corresponding to the current sensor in which the deterioration has occurred.

In an embodiment, the charging may be maintained by determining that the current sensor is in the normal operation, when the deterioration of the current sensor is not detected, as the result of the determination.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
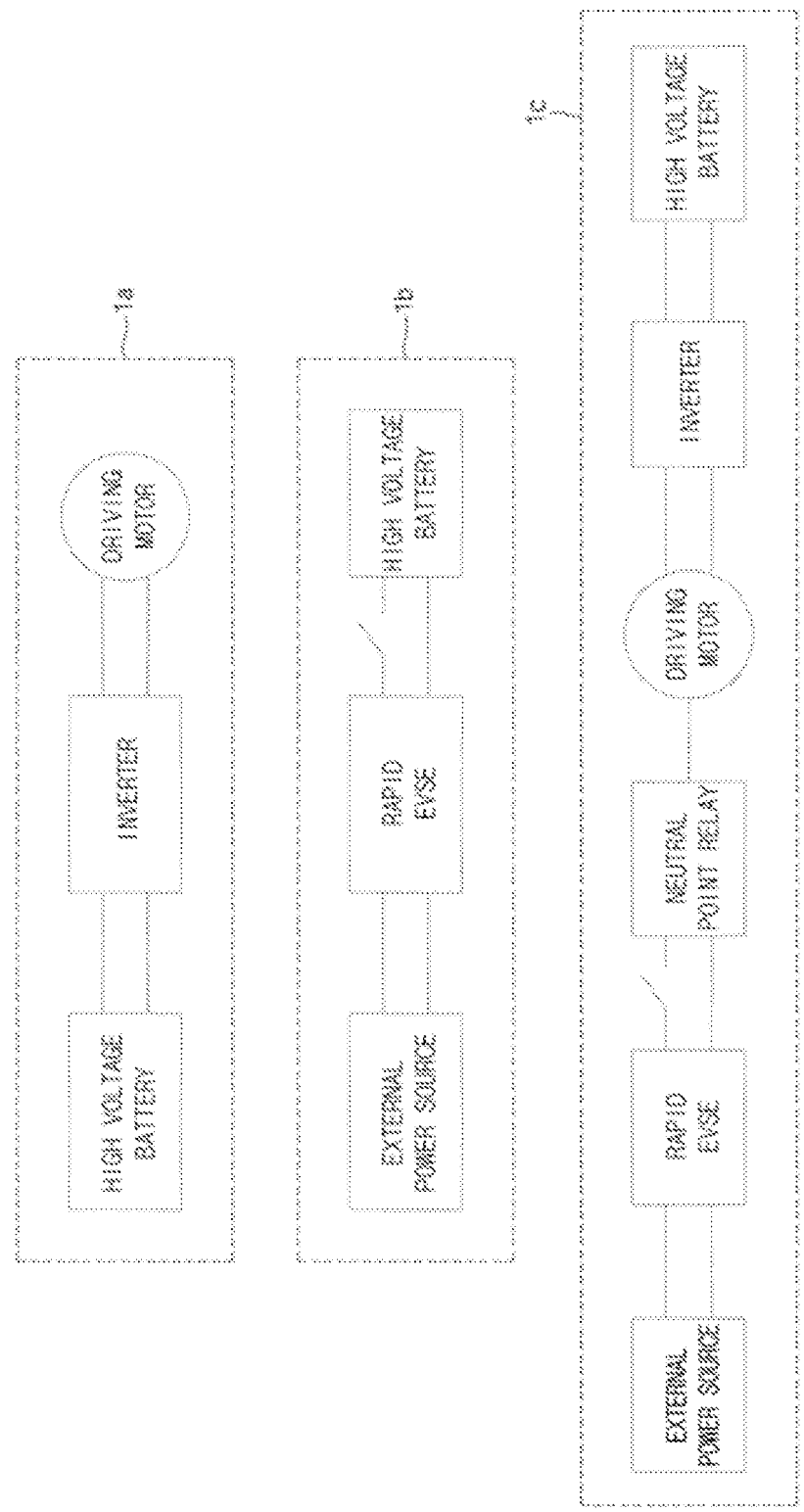
FIG. 1 (RELATED ART) is a diagram illustrating various electric vehicle charging methods using a high voltage battery.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 2 to 9.

Figure 2:
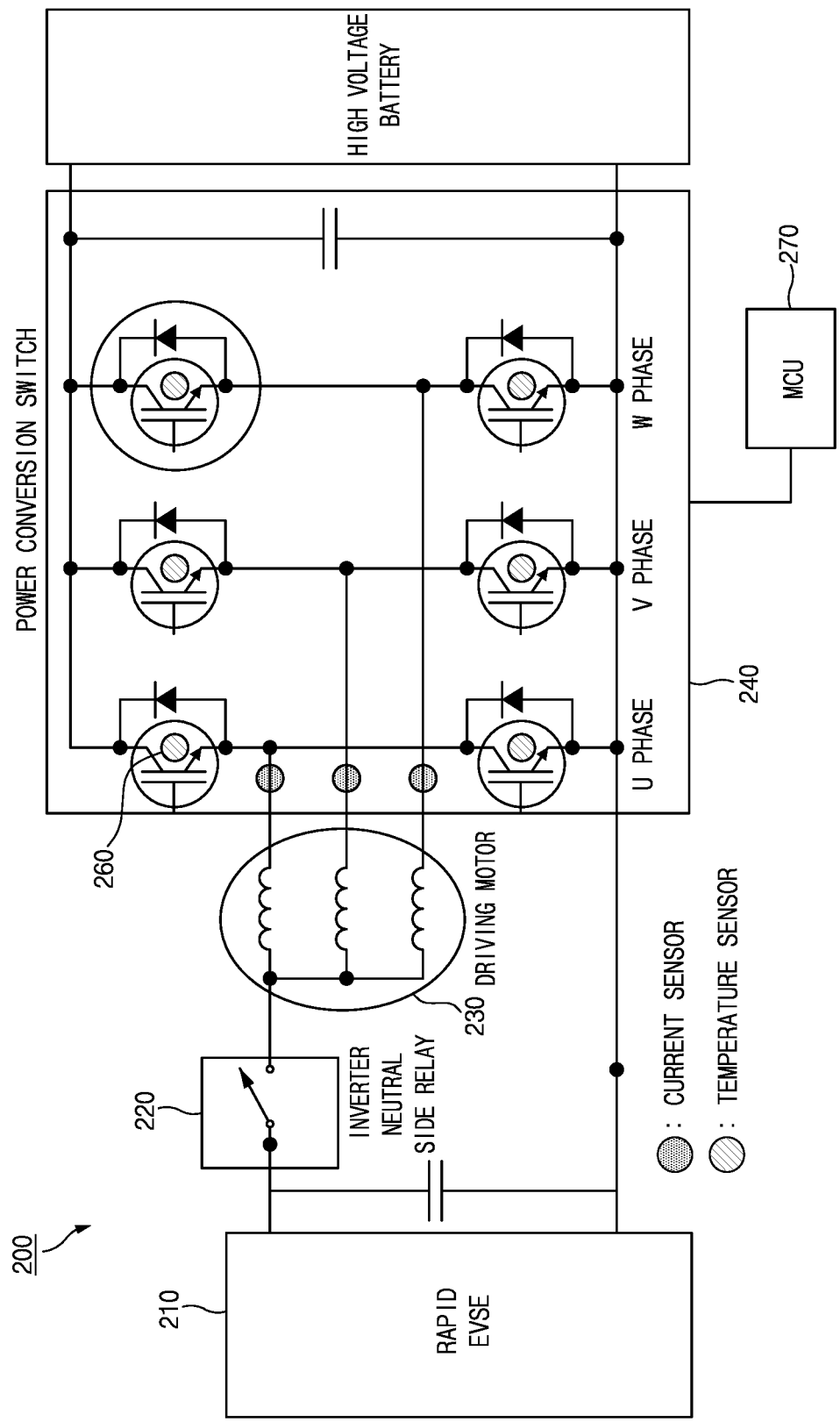
FIG. 2 is a circuit configuration diagram of a power conversion device for charging an electric vehicle, according to an embodiment of the present disclosure.

FIG. 2 is a circuit configuration diagram of a power conversion device for charging an electric vehicle, according to an embodiment of the present disclosure.

Referring to FIG. 2, a power conversion device 200 may include a rapid EVSE 210, an inverter neutral side relay 220, a driving motor 230, a power conversion switch 240, a current sensor 250, a temperature sensor 260, and a main controller 270.

The rapid EVSE 210 may receive vehicle information (e.g., whether it is stopped, whether the charging plug is engaged, etc.), and may transmit the EVSE information (e.g., whether the EVSE relay is engaged, etc.) to a vehicle's internal controller, by communicating with the vehicle's internal controller The inverter neutral side relay 220 may control an electrical connection between the rapid EVSE 210 and the driving motor 230/an inverter before multi-charging starts.

The driving motor 230 may repeatedly store and transfer electrical energy during switching an insulated gate bipolar transistor (IGBT) as a motor inductance component.

The power conversion switch 240 may control a flow of power to the high voltage battery by performing ON/OFF control of a plurality of IGBTs provided. As an example, the power conversion switch 240 may include a total of six IGBTs.

The current sensor 250 may sense an intensity of the three-phase (U-phase/V-phase/W-phase) current applied from the driving motor 230 to the power conversion switch 240. For example, the current sensor 250 may be a Hall-type current sensor.

The temperature sensor 260 may be disposed in the IGBT in the power conversion switch 240 to sense a temperature of the IGBT. For example, the temperature sensor 260 may be disposed in each IGBT. For example, the temperature sensor 260 may be a chip-type temperature sensor.

The main controller 270 may perform a pulse width modulation signal control, a fault diagnosis, a cooperative control with other controllers, etc., necessary for an operation of the inverter based on sensing values such as current and temperature.

FIGS. 3A to 3D are diagrams describing a power conversion procedure when an electric vehicle is charged, according to an embodiment of the present disclosure.

Figure 3A:
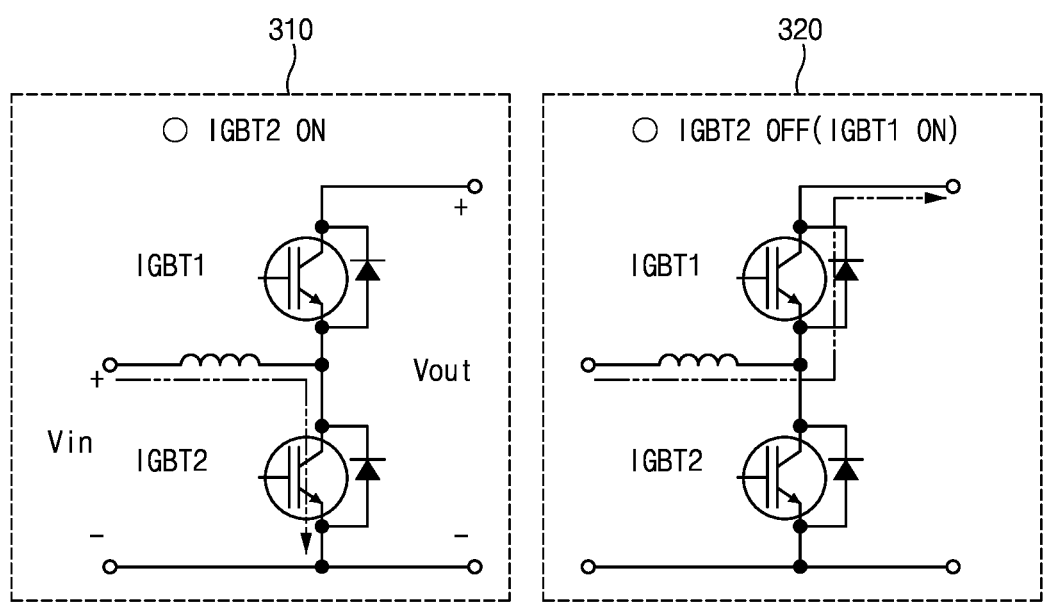
FIGS. 3A to 3D are diagrams describing a power conversion procedure when an electric vehicle is charged, according to an embodiment of the present disclosure.

Referring to FIG. 3A, the power conversion device 200 may perform the PWM control to alternately switch an IGBT1 and an IGBT2 of each phase (U, V, W) of the inverter to boost the voltage when charging an electric vehicle.

Reference numeral 310 of FIG. 3A is a current flow when the IGBT1 is OFF and the IGBT2 is ON, and reference numeral 320 is a current flow when the IGBT2 is OFF and the IGBT1 is ON.

Vin is a voltage of an inverter neutral point, that is, the EVSE output side, and Vout is a voltage of the battery side.

Energy applied from an external power source to an inductor is stored in the inductor and then transferred to the battery.

Figure 3B:
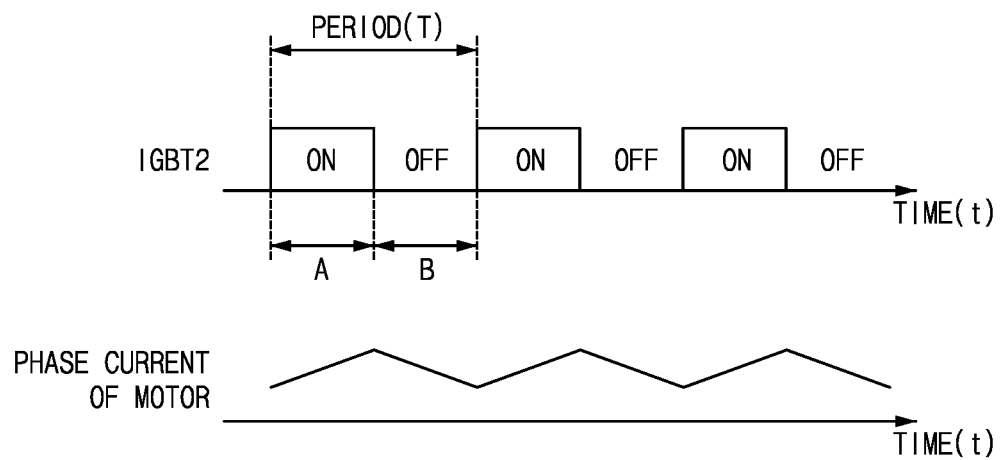

FIG. 3B illustrates a change in phase current of the motor according to ON/OFF of the IGBT2.

In this case, a boosting ratio (Vout/Vin), which is the ratio of the voltage Vin applied from the external power source and the inverter output voltage Vout, is determined by a duty of the IGBT2.

In this case, the duty is an ON time 'A' per switching period 'T', and the switching period 'T' is the sum of the ON time 'A' and an OFF time 'B'.

Figure 3C:
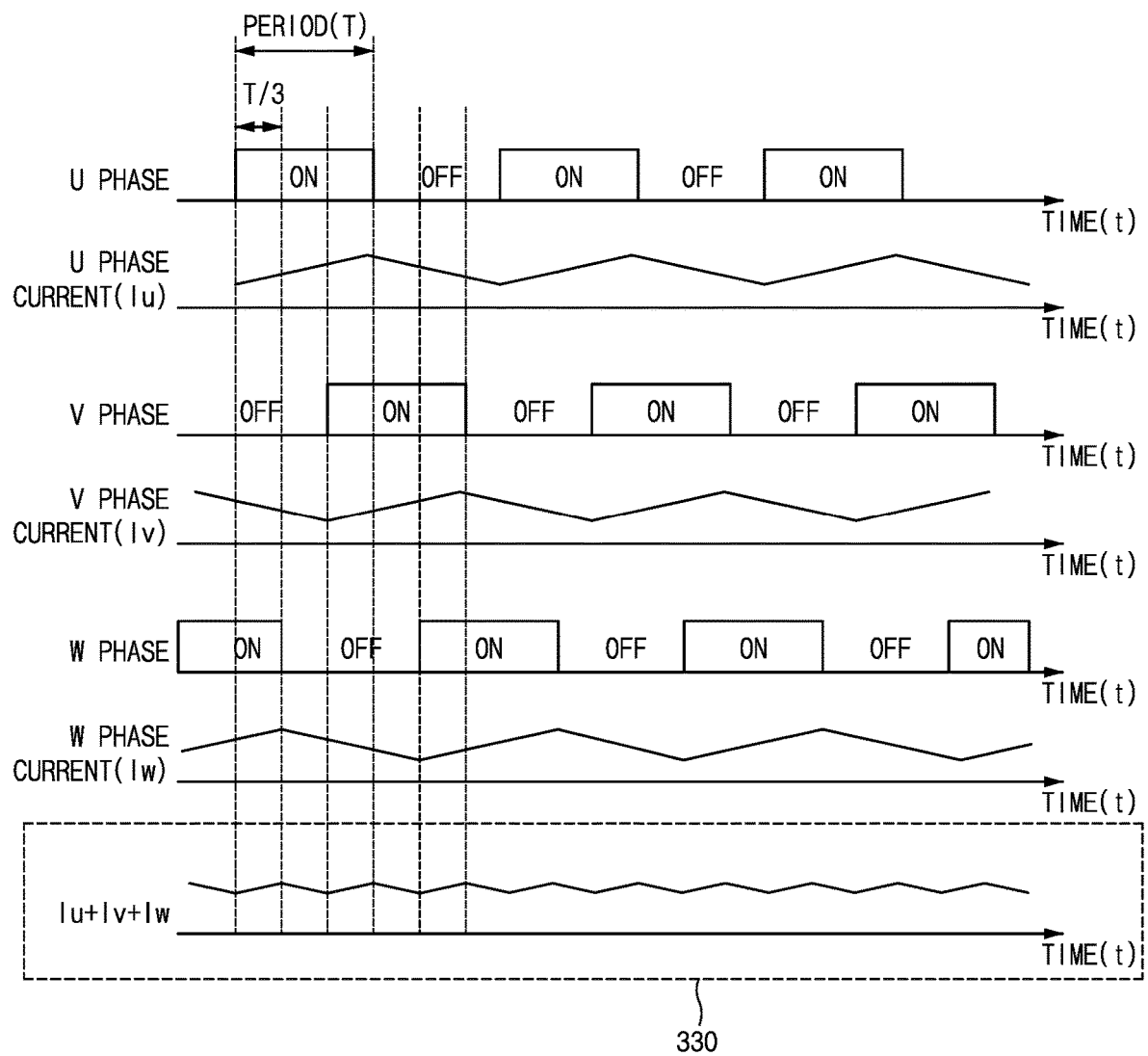

As illustrated in FIG. 3C, the power conversion device 200 may perform a three-phase interleave control with a third period 'T/3' of the switching period 'T' to reduce a ripple an input current.

The output of the inverter may be controlled by U-phase duty, V-phase duty, and W-phase duty.

The power conversion device 200 may minimize the ripple by summing and outputting currents of each phase every 'T/3' as illustrated in reference numeral 330.

In the embodiment of FIG. 3C, it is described that the summing period of each phase current for minimizing the ripple of the inverter output current is 'T/3', but this is only one embodiment, and the summing period according to the design of those skilled in the art may be set shorter or longer than that.

Figure 3D:
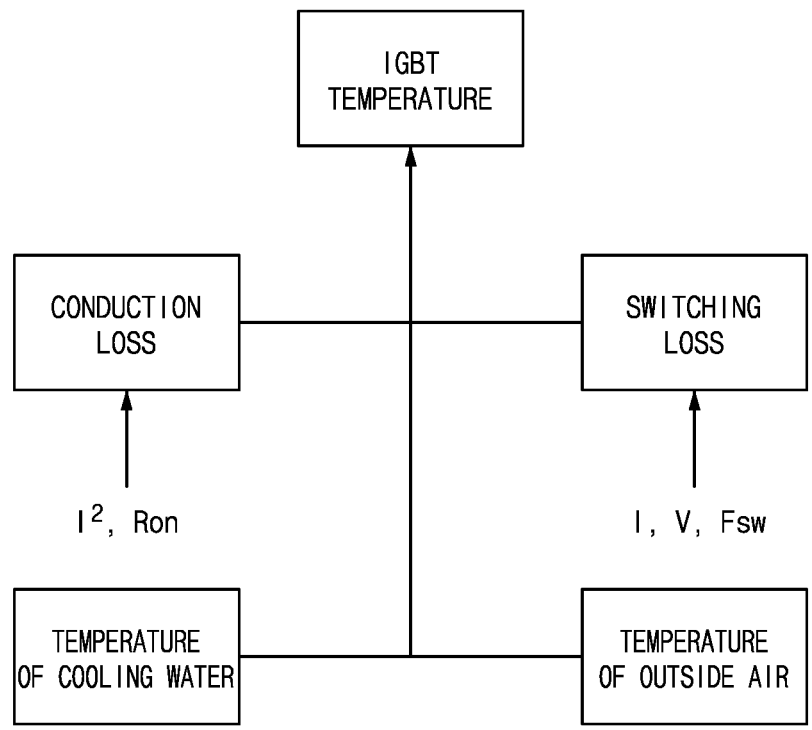

Referring to FIG. 3D, the IGBT temperature rises as an outside air temperature, a cooling water temperature, and an amount of power conversion loss increase.

As the outside temperature increases, since a natural heat dissipation rate of the cooling water heated by an IGBT generated heat is slowed, a device temperature rises during charging.

As the cooling water temperature increases, since the rate at which the IGBT generated heat escapes is slowed, the device temperature rises during charging.

The amount of power conversion loss may include a conduction loss and a switching loss. The conduction loss is proportional to the amount of current during conduction and a conduction resistance, and the switching loss is proportional to the amount of current, voltage, and switching frequency during switching. That is, as the current flowing through the IGBT increases, the IGBT temperature rises.

Figure 4:
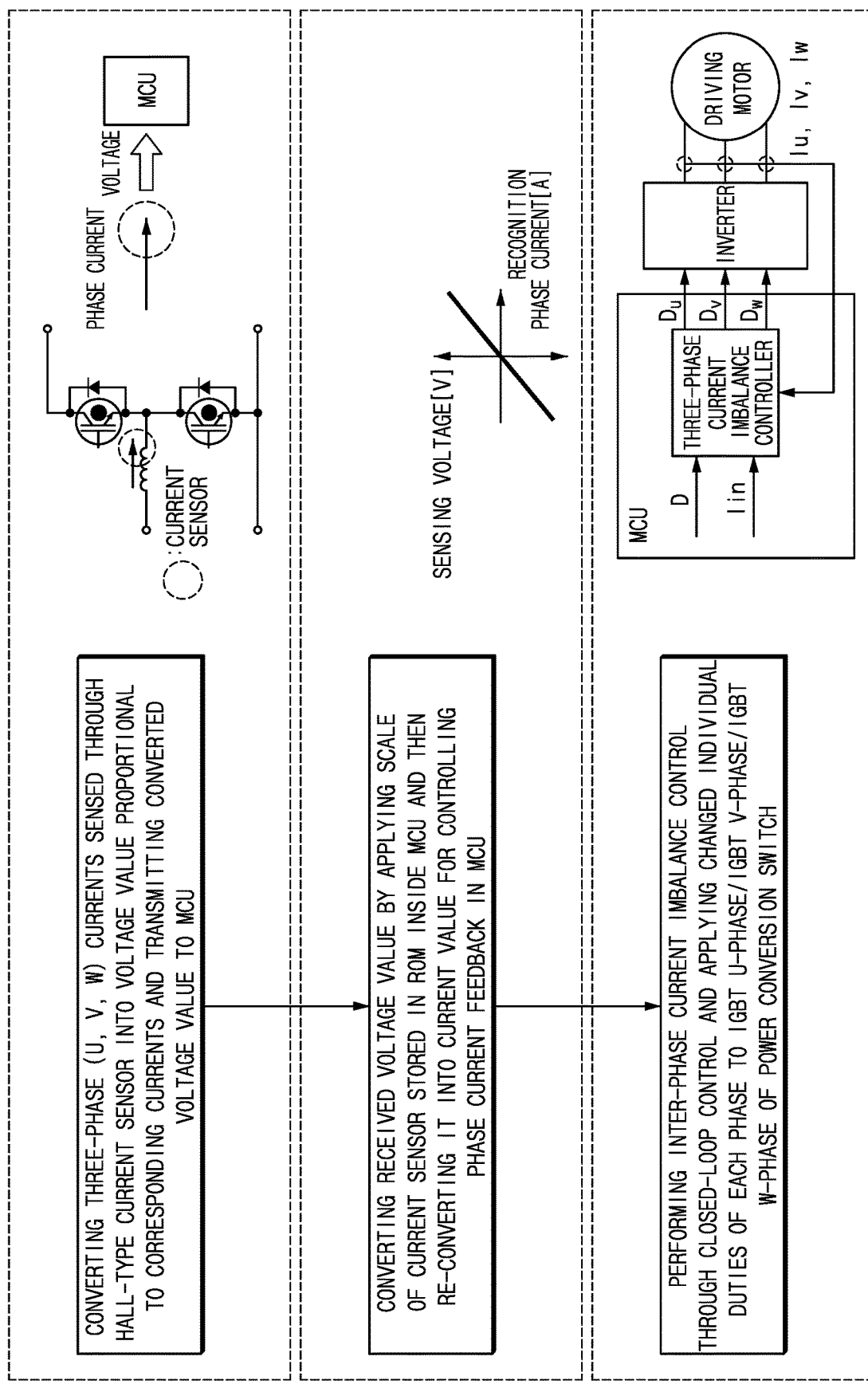
FIG. 4 is a diagram describing a current control method applied when a conventional electric vehicle is charged.

FIG. 4 is a diagram describing a current control method applied when a conventional electric vehicle is charged.

A conventional power conversion device converts three-phase (U, V, W) currents sensed through the Hall-type current sensor into a voltage value proportional to the corresponding currents and transmits the converted voltage value to the MCU.

The power conversion device converts the received voltage value by applying a scale 'α' of the current sensor stored in an ROM inside MCU and then re-converts it into a current value for controlling a phase current feedback in the MCU.

In this case, the scale 'α' of the current sensor is calculated by dividing the MCU received voltage by the MCU recognition voltage, and a three-phase common current sensor scale may be applied when converting current.

The power conversion device performs inter-phase current imbalance control through closed-loop control and applies the changed individual duties Du, Dv, and Dw of each phase to IGBT U-phase/IGBT V-phase/IGBT W-phase of a power conversion switch.

The three-phase current imbalance controller performs feedback controls with sensing values of Iu, Iv, and Iw by using 'D' and 'Iin', and generates the individual duties Du, Dv, and Dw such that Iin=Iu+Iv+Iw, and Iu=Iv=Iw.

In this case, to maintain the neutral point voltage control, the duty 'D' maintains an average value of the individual duties Du, Dv, and Dw of each phase as illustrated in the following equation.

$$D=Avg(Du+Dv+Dw)$$

In this case, Iin is a command current of an inverter neutral point input, and Iu, Iv and Iw are three-phase sensing currents, and 'D' is a three-phase common duty value generated for a neutral point voltage control.

Figure 5:
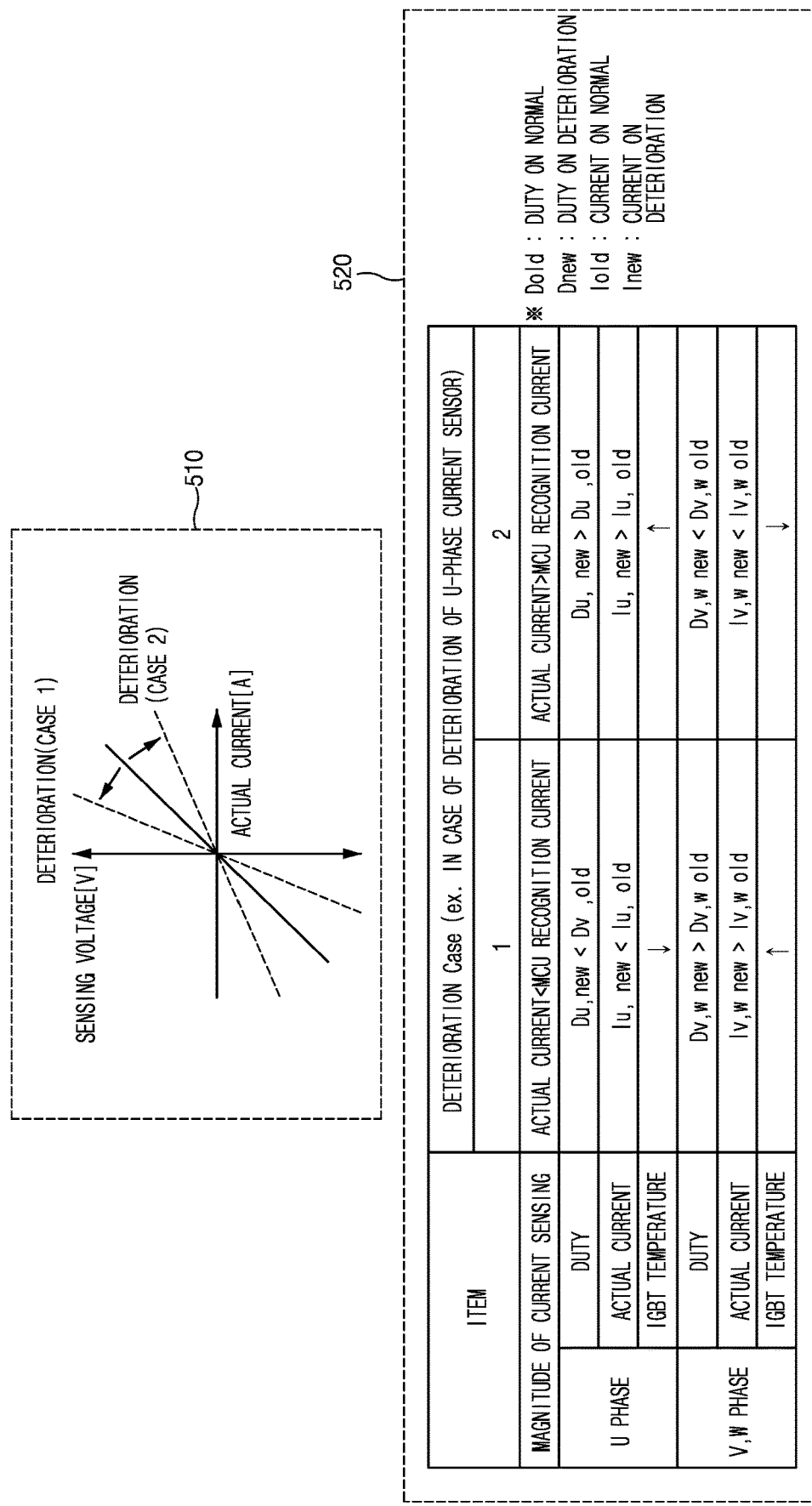
FIG. 5 is a diagram describing a case of deterioration of a power conversion device.

FIG. 5 is a diagram describing a case of deterioration of the power conversion device.

Referring to reference numeral 510, when the current sensor of one phase deteriorates during charging, the voltage (i.e., sensing voltage) sensed with respect to the current actually flowing in the corresponding phase, that is, the actual current may be measured to be high or low. Case 1 is a case where the voltage is sensed higher than the actual current, and Case 2 is a case where the voltage is sensed lower than the actual current.

Reference numeral 520 is a table summarizing major change control and measured value change for each deterioration case.

The MCU 270 may recognize that the three-phase current is equally controlled through the imbalance control in the MCU 270 due to the difference between the MCU recognized current and the actual current. However, under normal control, a U-phase actual current may decrease in Case 1 and may increase in Case 2. In this case, since the V-phase current Iv and the W-phase current Iw are the same even when the input current Iin is deteriorated, remaining phase currents increase in Case 1 and decrease in Case 2.

Even when the V-phase or (and) the W-phase current sensor deteriorates, the phase current of the corresponding deteriorated current sensor decreases in Case 1 and increases in Case 2, and the remaining phase current increases in Case 1 and decreases in Case 2.

Since a conduction loss and a switching loss increases when a magnitude of the actual current flowing through the IGBT increases, the IGBT temperature decreases in Case 1 and increases in Case 2 compared to normal, and the IGBT temperatures of V-phase and W-phase increases in Case 1 and decreases in Case 2 compared to normal. When the internal temperature increases, the MCU 270 sets an output limit above a specific temperature for over-temperature protection or stops charging through PWM OFF. For example, when the temperature of the outside air or the cooling water is high or charging conditions are poor, such as charging with a high current, a probability of output limitation or charging interruption may increase due to the IGBT temperature that is further increased by a phase current imbalance due to deterioration of the current sensor.

As described above, in the conventional charging system, there is a current imbalance controller inside the MCU, but the controller recalculates the actual current through the current sensor scale based on the voltage sensed by the normal current sensor, and then updates each phase duty by performing feedback control to follow the MCU recognized current. However, since the actual current is misrecognized from the beginning when deterioration occurs, there is a problem in that it is impossible to control the actual phase current imbalance.

Therefore, to achieve a purpose of controlling the imbalance based on the actual current in the case of deterioration, and to prevent the additional increase in IGBT temperature caused by the phase current imbalance, even in the worst charging conditions when the outside air or cooling water is high temperature or charging with a high current is performed, there is a need for a charging system that can prevent output limiting or charging interruption due to over-temperature of a device.

Figure 6:
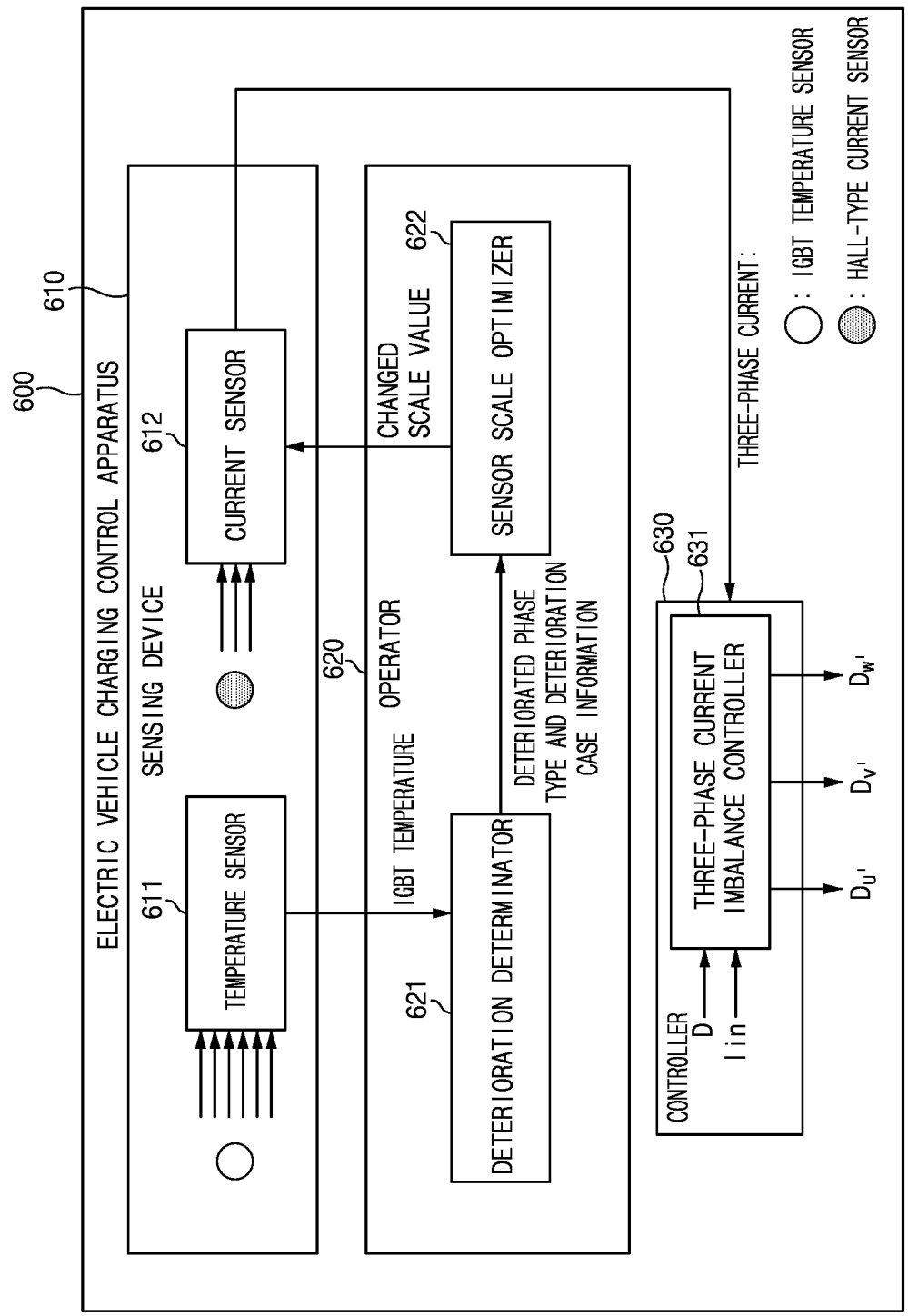
FIG. 6 is a block diagram describing a configuration of an electric vehicle charging control apparatus according to an embodiment of the present disclosure.

FIG. 6 is a block diagram describing a configuration of an electric vehicle charging control apparatus according to an embodiment of the present disclosure.

Hereinafter, for convenience of description, an electric vehicle charging control apparatus 600 will be simply named as an 'apparatus 600' and will be described.

The apparatus 600 according to the present embodiment may be implemented on the MCU 270 of FIG. 2 described above, but this is only one embodiment, and it may be implemented as a device separate from the MCU 270 and may be interworked with the MCU 270.

Referring to FIG. 6, the apparatus 600 may include a sensing device 610, an operator 620, and a controller 630.

The sensing device 610 may be configured to include a temperature sensor 611 and a current sensor 612.

The temperature sensor 611 may receive a voltage output by the IGBT temperature sensor, and may convert the received voltage value into an IGBT temperature value by using a pre-stored temperature/voltage conversion table.

The current sensor 612 may receive a voltage output by a Hall-type current sensor and convert the received voltage value into a current value by using the current sensor scale.

The operator 620 may include a deterioration determiner 621 and a sensor scale optimizer 622.

The deterioration determiner 621 may compare each phase IGBT temperatures received from the temperature sensor 611 during normal operation of the current imbalance controller. In this case, the deterioration determiner 621 may determine whether the current sensor is deteriorated by comparing a temperature difference between the phases with a preset reference value, and may identify the phase type in which deterioration of the current sensor occurs and a deterioration case. For example, the deterioration determiner

621 may measure temperature differences of the IGBT1 and the IGBT2 with respect to the U-phase, the V-phase, and the W-phase. For logic robustness, the deterioration determiner 621 may determine that the current sensor deterioration has occurred only when the temperature differences between the phases of both the IGBT1 and the IGBT2 deviates from a predetermined reference value.

The sensor scale optimizer 622 may change the current sensor scale in units of a specific value based on the deteriorated phase type information and/or the deterioration case received from the deterioration determiner 621, and may transmit the changed scale value to the current sensor 612.

The controller 630 may include a three-phase current imbalance controller 631. The three-phase current imbalance controller 631 according to the present embodiment may be implemented in the same manner as in the conventional structure.

The three-phase current imbalance controller 631 may receive the three-phase current value from the sensor 610 and may update the existing duty for each phase through feedback control with the neutral point current command, thereby controlling the sensing current value to be balanced.

Figure 7:
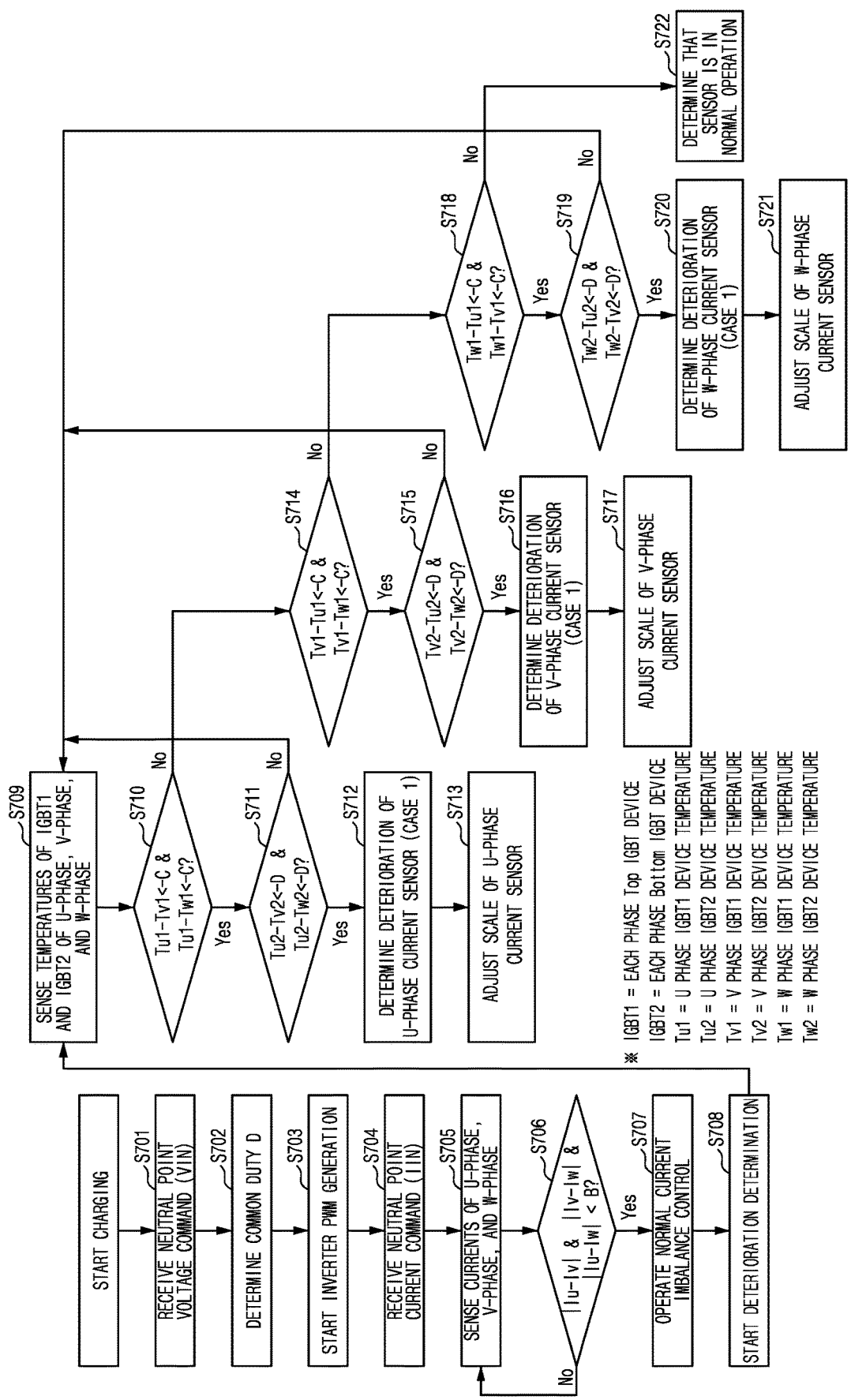
FIG. 7 is a flowchart describing a charging control method in an electric vehicle charging control apparatus according to an embodiment of the present disclosure.

FIG. 7 is a flowchart describing a charging control method in an electric vehicle charging control apparatus according to an embodiment of the present disclosure.

In particular, FIG. 7 is a diagram for describing deterioration determination logic for Case 1 in the deterioration determiner 621 of FIG. 6.

Referring to FIG. 7, the apparatus 600 may receive a neutral point voltage command Vin when charging is started (S701).

The apparatus 600 may determine a common duty 'D' based on the neutral point voltage command Vin, and may generate a PWM signal corresponding to the determined common duty to provide it to the inverter (S702 and S703).

The apparatus 600 may perform three-phase (U-phase, V-phase, and W-phase) current sensing based on the neutral point current command Iin (S704 and S705).

The apparatus 600 may compare differences between the three-phase current sensing values Iu, Iv, and Iw with a predetermined reference value 'B' (S706).

As a result of the comparison, when the differences between the three-phase current sensing values is all less than the reference value 'B', the apparatus 600 may perform a normal current imbalance control operation (S707).

Thereafter, the apparatus 600 may initiate a deterioration determination procedure (S708).

The following operations may be operations performed by the deterioration determiner 621 of FIG. 6.

The apparatus 600 may perform temperature sensing of the three-phase IGBT 1 and IGBT 2 (S709). Hereinafter, U-phase IGBT 1 device temperature is named as a 'Tu1', U-phase IGBT 2 device temperature is named as a 'Tu2', V-phase IGBT 1 device temperature is named as a 'Tv1', V-phase IGBT 2 device temperature is named as a 'Tv2', W-phase IGBT 1 device temperature is named as a 'Tw1', and W-phase IGBT 2 device temperature is named as a 'Tw2', and will be described.

The apparatus 600 may determine whether both the difference value between Tu1 and Tv1 and the difference value between Tu1 and Tw1 are less than a first threshold value 'C' (S710).

When both difference values are less than the first threshold value, as the result of the determination in S710, the apparatus 600 may determine whether both the difference value between Tu2 and Tv2 and the difference value between Tu2 and Tw2 are less than a second threshold value 'D' (S711).

When both difference values are less than the second threshold value, as the result of the determination in S711, the apparatus 600 may determine that the U-phase current sensor is deteriorated and may adjust a scale of the U-phase current sensor (S711 to S713).

When both difference values are not less than the first threshold value, as the result of the determination in S710, the apparatus 600 may determine whether both the difference value between Tv1 and Tu1 and the difference value between Tv1 and Tw1 are less than the first threshold value 'C' (S714).

When both difference values are less than the first threshold value, as the result of the determination in S714, the apparatus 600 may determine whether both the difference value between Tv2 and Tu2 and the difference value between Tv2 and Tw2 are less than the second threshold value 'D' (S715).

When both difference values are less than the second threshold value, as the result of the determination in S715, the apparatus 600 may determine that the V-phase current sensor is deteriorated and may adjust a scale of the V-phase current sensor (S716 and S717).

When both difference values are not less than the first threshold value, as the result of the determination in S714, the apparatus 600 may determine whether both the difference value between Tw1 and Tu1 and the difference value between Tw1 and Tv1 are less than the first threshold value 'C' (S718).

When both difference values are less than the first threshold value, as the result of the determination in S718, the apparatus 600 may determine whether both the difference value between Tw2 and Tu2 and the difference value between Tw2 and Tv2 are less than the second threshold value 'D' (S719).

When both difference values are less than the second threshold value, as the result of the determination in S719, the apparatus 600 may determine that the W-phase current sensor is deteriorated and may adjust W-phase current sensor scale (S720 and S721).

When both difference values are not less than the first threshold value, as the result of the determination in S718, the apparatus 600 may determine that there is no current sensor deterioration (S722).

When the difference values are not less than threshold values, as the result of the determination in S711, S715, or S719, the apparatus 600 may perform S709.

In the above embodiment, the thresholds 'C' and 'D' for determining whether the current sensor is deteriorated may be determined in consideration of a load condition, a temperature sensor position deviation, a sensing error, and a current sensor sensing error, and the like, and in consideration of logic robustness.

Figure 8:
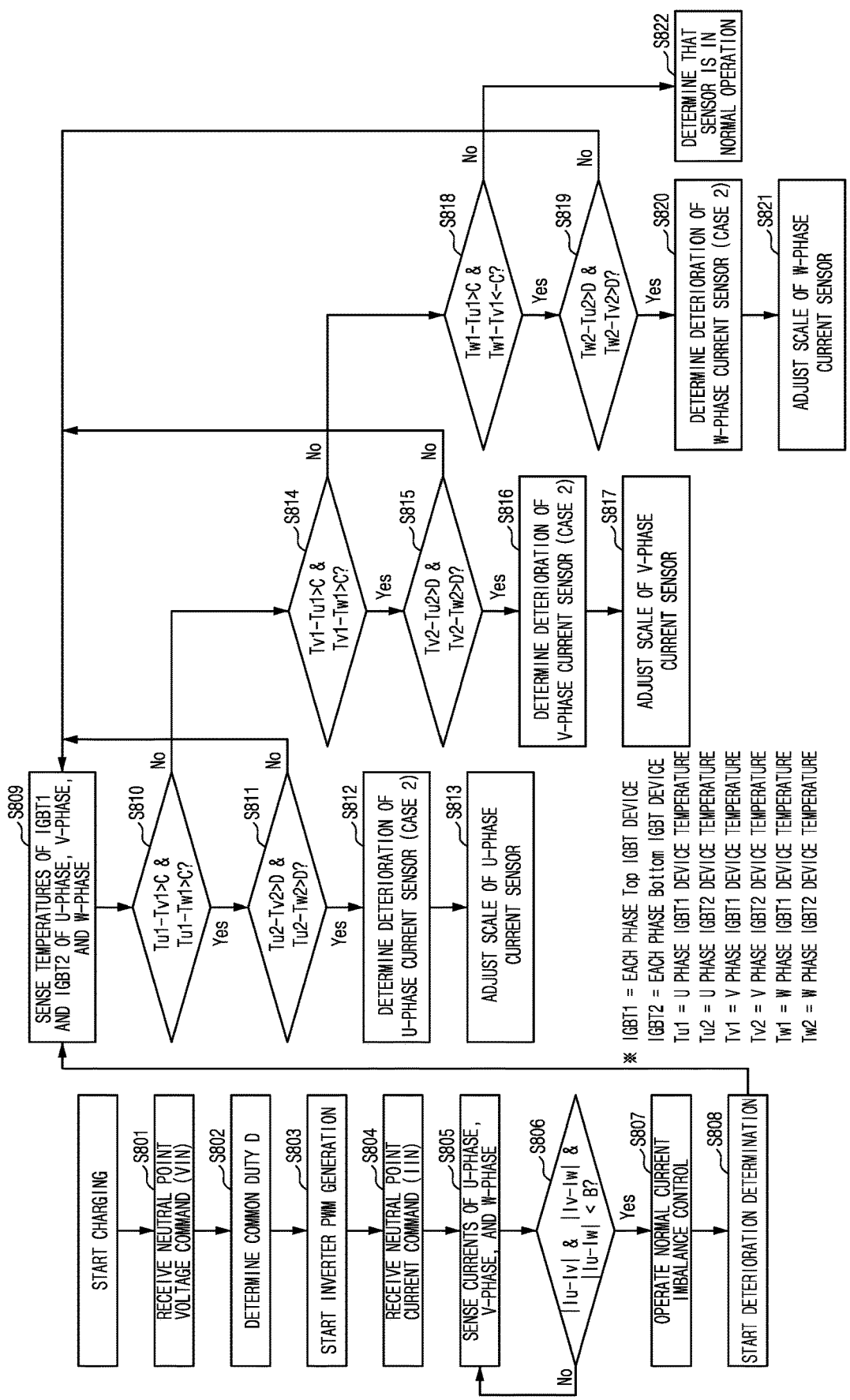
FIG. 8 is a flowchart describing a charging control method in an electric vehicle charging control apparatus according to another embodiment of the present disclosure.

FIG. 8 is a flowchart describing a charging control method in an electric vehicle charging control apparatus according to another embodiment of the present disclosure.

In particular, FIG. 8 is a diagram for describing the deterioration determination logic for Case 2 in the deterioration determiner 621 of FIG. 6.

Referring to FIG. 8, the apparatus 600 may receive the neutral point voltage command Vin when charging is started (S801).

The apparatus 600 may determine the common duty 'D' based on the neutral point voltage command Vin, generate the PWM signal corresponding to the determined common duty, and provide it to the inverter (S802 and S803).

The apparatus 600 may perform the three-phase (U-phase, V-phase, and W-phase) current sensing based on the neutral point current command Iin (S804 and S805).

The apparatus 600 may compare the differences between the three-phase current sensing values Iu, Iv, and Iw with the predetermined reference value 'B' (S806).

As a result of comparison, when the differences between the three-phase current sensing values are all less than the reference value 'B', the apparatus 600 may perform a normal current imbalance control operation (S807).

Thereafter, the apparatus 600 may initiate the deterioration determination procedure (S808).

The following operations may be operations performed by the deterioration determiner 621 of FIG. 6.

The apparatus 600 may perform temperature sensing of the three-phase IGBT 1 and IGBT 2 (S809). Hereinafter, U-phase IGBT 1 device temperature is named as a 'Tu1', U-phase IGBT 2 device temperature is named as a 'Tu2', V-phase IGBT 1 device temperature is named as a 'Tv1', V-phase IGBT 2 device temperature is named as a 'Tv2', W-phase IGBT 1 device temperature is named as a 'Tw1', and W-phase IGBT 2 device temperature is named as a 'Tw2', and will be described.

The apparatus 600 may determine whether both the difference value between Tu1 and Tv1 and the difference value between Tu1 and Tw1 are greater than the first threshold 'C' (S810).

When both difference values are greater than the first threshold value 'C', as the result of the determination in S810, the apparatus 600 may determine whether both the difference value between Tu2 and Tv2 and the difference value between Tu2 and Tw2 are greater than the second threshold 'D' (S811).

When both difference values are greater than the second threshold 'D', as the result of the determination in S811, the apparatus 600 may determine that the U-phase current sensor is deteriorated and may adjust a scale of the U-phase current sensor (S811 and S812).

When both difference values are not greater than the first threshold value 'C', as the result of the determination in S810, the apparatus 600 may determine whether both the difference value between Tv1 and Tu1 and the difference value between Tv1 and Tw1 are greater than the first threshold 'C' (S814).

When both difference values are greater than the first threshold 'C', as the result of the determination in S814, the apparatus 600 may determine whether both the difference value between Tv2 and Tu2 and the difference value between Tv2 and Tw2 are greater than the second threshold 'D' (S815).

When both difference values are greater than the second threshold 'D', as the result of the determination in S815, the apparatus 600 may determine that the V-phase current sensor is deteriorated and may adjust a scale of the V-phase current sensor (S816, and S817).

When both difference values are not greater than the first threshold 'C', as the result of the determination in S814, the apparatus 600 may determine whether both the difference value between Tw1 and Tu1 and the difference value between Tw1 and Tv1 are greater than the first threshold 'C'(S818).

When both difference values are greater than the first threshold 'C', as the result of the determination in S818, the apparatus 600 may determine whether both the difference value between Tw2 and Tu2 and the difference value between Tw2 and Tv2 are greater than the second threshold 'D' (S819).

When both difference values are greater than the second threshold 'D', as the result of the determination in S815, the apparatus 600 may determine that the W-phase current sensor is deteriorated and may adjust a scale of the W-phase current sensor (S820 and S821).

When both difference values are not greater than the first threshold 'C', as the result of the determination in S818, the apparatus 600 may determine that there is no current sensor deterioration (S822).

When the difference values are not greater than threshold values, as the result of the determination in S811, S815, or S819, the apparatus 600 may perform S809.

In the above embodiment, the thresholds 'C' and 'D' for determining whether the current sensor is deteriorated may be determined in consideration of a load condition, a temperature sensor position deviation, a sensing error, and a current sensor sensing error, and the like, and in consideration of logic robustness.

In the embodiments of FIGS. 7 to 8, in the case of deterioration Case 1/2, since the case where the temperature is lower than that of the other phase is Case 1 (because the MCU recognition current is high due to the increase in the MCU sensing voltage), and the case where the temperature is higher than that of the other phase is Case 2, whether deterioration has occurred may be determined by comparing the temperature difference with other phases with threshold values of different signs.

In the embodiments of FIGS. 7 to 8, when it is determined that the sensor is normal even when the deterioration re-determination is performed, the apparatus 600 may end the deterioration determination logic and may maintain charging operation.

Figure 9:
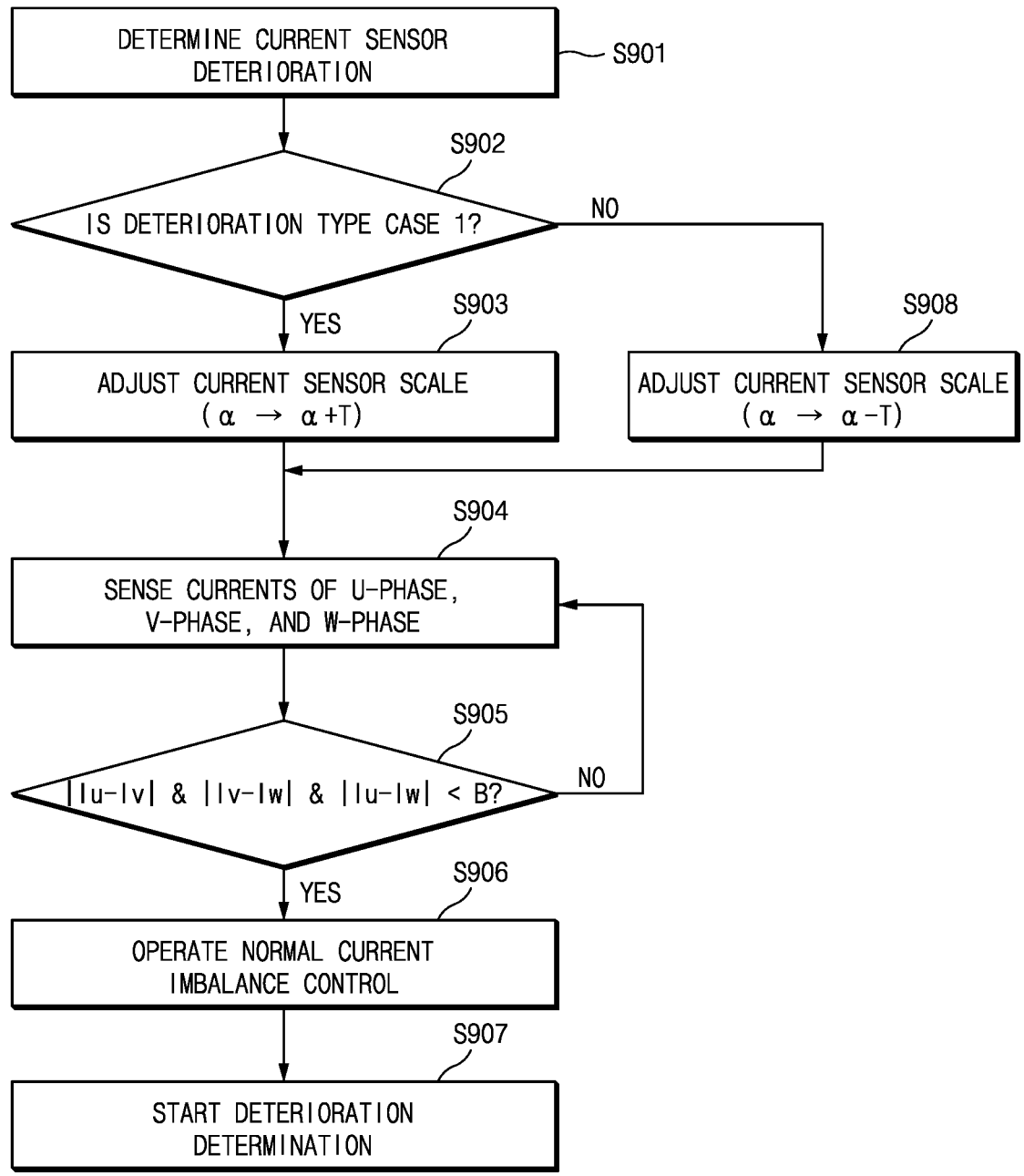
FIG. 9 is a flowchart describing a charging control method in an electric vehicle charging control apparatus according to another embodiment of the present disclosure.

FIG. 9 is a flowchart describing a charging control method in an electric vehicle charging control apparatus according to another embodiment of the present disclosure.

In particular, FIG. 9 is a diagram for describing a current sensor scale control operation in the sensor scale optimizer 622 of FIG. 6.

Referring to FIG. 9, the apparatus 600 may receive a result of current sensor deterioration determination from the deterioration determiner 621 (S901). In this case, the result of the current sensor deterioration determination may include deteriorated phase type information and/or deterioration type information, that is, deterioration case identification information. In this case, the deterioration determiner 621 may determine whether deterioration is occurred when the three-phase current imbalance controller 631 is in a normal operating condition. The deterioration determiner 621 may determine whether each phase is deteriorated by sensing the temperatures of top and bottom IGBTs (i.e., IGBT 1 and IGBT 2) for each phase, and then comparing the temperatures between the Top IGBTs and the temperatures between the Bottom IGBTs. Since such the operation effectively reflects a situation in which RMS (Root Mean Square) current values of one cycle of the top IGBT and the bottom IGBT in one phase vanes depending on the duty, determination of whether there is the deterioration may be made more accurately. In addition, to secure the robustness of the logic from measurement errors due to sensing noise, and the like, since the deterioration of the current sensor is determined when the temperature sensing differences with the other phases is greater than or equal to a specific value for both the top and the bottom, reliability for the determination of whether there is the deterioration may be secured.

The apparatus 600 may determine whether the deterioration type is Case 1 based on the received deterioration determination result of the current sensor (S902).

As the result of the determination of S902, when the deterioration type is Case 1, the apparatus 600 may adjust the current sensor scale 'α' upward by a specific level 'T' (S903).

The apparatus 600 may perform three-phase (U-phase, V-phase, and W-phase) current sensing (S904).

The apparatus 600 may compare the differences between the three-phase current sensing values Iu, Iv, and Iw with the predetermined reference value 'B' (S905).

As the result of comparison, when the differences between the three-phase current sensing values is all less than the reference value 'B', the apparatus 600 may perform the normal current imbalance control operation (S906).

Thereafter, the apparatus 600 may perform the deterioration determination procedure (S907).

When the deterioration type is not Case 1 in S902, that is, Case 2 based on the received deterioration determination result of the current sensor, the apparatus 600 may adjust the current sensor scale 'α' downward by the specific level 'T' (S908). Thereafter, the apparatus 600 may perform S904 described above.

Accordingly, the method or the steps of algorithm described in connection with the embodiments disclosed herein may be implemented directly in hardware, a software module, or a combination of the two, which is executed by the processor. The software module may reside in a storage medium (i.e., the memory and/or the storage) such as a RAM, a flash memory, a ROM, an EPROM, an EEPROM, a register, a hard disk, a removable disk, and a CD-ROM.

A storage medium is coupled to the processor, the processor may read information from, and write information to, the storage medium. Alternatively, the storage medium may be integrated with the processor. The processor and storage medium may reside within an application specific integrated circuit (ASIC). The ASIC may reside within the user terminal. Alternatively, the processor and storage medium may reside as separate components within the user terminal.

According to an embodiment, the present disclosure may provide a charging control method for an electric vehicle and an apparatus therefor.

In addition, according to an embodiment, the present disclosure may provide an electric vehicle charging control method capable of preventing in advance the output limitation or charging interruption due to device over-temperature, by preventing further increase in IGBT temperature due to phase current imbalance, and an apparatus therefor.

In addition, according to an embodiment, the present disclosure may provide an electric vehicle charging control method capable of minimizing a difference between an actual current and an MCU recognized current, by determining the deterioration of the current sensor for each phase using the difference in the IGBT temperature sensing value for each phase, and by dynamically changing the current sensor scale when determining the deterioration, and an apparatus therefor.

In addition, according to an embodiment, the present disclosure may provide an electric vehicle charging control method capable of increasing device durability by lowering the maximum operating temperature of the IGBT device by performing the actual current-based imbalance control through the optimization of the current sensor scale according to the deterioration and the degree of deterioration, and an apparatus therefor.

In addition, according to an embodiment, the present disclosure may minimize consumer complaints during charging, by preventing additional increase in IGBT temperature due to current imbalance between phases even under adverse conditions such as high temperature of an outside air and/or a coolant, or charging with high current, and preventing output limitation or charging interruption due to over-temperature.

In addition, according to an embodiment, the present disclosure may increase the output through the same IGBT device by utilizing the temperature margin obtained through prevention of the additional increase in the IGBT temperature.

In addition, according to an embodiment, the present disclosure may provide a safer and better electric power conversion apparatus by adding deterioration determination logic and current sensor scale optimization logic without an increase in cost due to additional hardware addition.

In addition, various effects directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure. Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A charging control method for an electric vehicle that boosts a charging voltage by using a motor and an inverter, the charging control method comprising:
    determining, by a deterioration determiner, whether a current imbalance control is normally operated based on currents input from the motor to three-phase inputs of the inverter during charging;
    determining, by the deterioration determiner, whether a current sensor is deteriorated based on a result of an internal temperature sensing of the inverter when the current imbalance control is in a normal operation; and
    adjusting, by a sensor scale optimizer, a scale of the current sensor to maintain the charging, when a deterioration of the current sensor is detected.

2. The charging control method of claim 1, wherein the current sensor includes a three-phase current sensor operating as a U-phase current sensor, a V-phase current sensor, and a W-phase current sensor, and wherein the current imbalance control is performed based on three-phase currents changed depending on the adjusted scale of the current sensor.

3. The charging control method of claim 2, wherein determining whether the current sensor is deteriorated is determined based on a difference in an IGBT (Insulated Gate Bipolar Transistor) temperature sensing value for each phase.

4. The charging control method of claim 3, wherein determining whether the current sensor is deteriorated when the current imbalance control is in the normal operation includes:
    comparing the difference in the IGBT temperature sensing value for each phase with a predetermined reference value to identify the current sensor in which the deterioration has occurred and a deterioration case.

5. The charging control method of claim 4, wherein the scale of the current sensor is adjusted upward or downward based on the identified deterioration case.

6. The charging control method of claim 4, wherein two IGBTs are included for each phase, and the predetermined reference value is applied differently to the two IGBTs.

7. The charging control method of claim 6, wherein the predetermined reference values for the two IGBTs have different signs depending on the deterioration case.

8. The charging control method of claim 4, wherein the predetermined reference value is determined in consideration of at least one of a load condition, a temperature sensor position deviation, a temperature sensing error, or a current sensor sensing error.

9. The charging control method of claim 4, wherein the scale adjustment of the current sensor is performed with respect to a phase corresponding to the current sensor in which the deterioration has occurred.

10. The charging control method of claim 4, further comprising:
   determining that the current sensor is in the normal operation and maintaining the charging, when the deterioration of the current sensor is not detected.

11. A charging control apparatus for an electric vehicle that boosts a charging voltage by using a motor and an inverter, the charging control apparatus comprising:
   a sensing device configured to sense an internal temperature of the inverter and currents input from the motor to three-phase inputs of the inverter;
   a deterioration determiner configured to determine whether a current imbalance control is normally operated based on a current sensing result by a current sensor of the sensing device during charging, and to determine whether the current sensor is deteriorated based on the temperature sensing result when the current imbalance control is in a normal operation; and
   a sensor scale optimizer configured to adjust a scale of the current sensor when a deterioration of the current sensor is detected.

12. The charging control apparatus of claim 11, wherein the current sensor includes a three-phase current sensor operating as a U-phase current sensor, a V-phase current sensor, and a W-phase current sensor, and wherein the apparatus further includes a three-phase current imbalance controller configured to perform the current imbalance control based on three-phase currents changed depending on the adjusted scale of the current sensor.

13. The charging control apparatus of claim 11, wherein the deterioration determiner determines whether the current sensor is deteriorated based on a difference in an IGBT (Insulated Gate Bipolar Transistor) temperature sensing value for each phase, which is received from the sensing device.

14. The charging control apparatus of claim 13, wherein the deterioration determiner compares the difference in the IGBT temperature sensing value for each phase with a predetermined reference value when the current imbalance control is in the normal operation to identify the current sensor in which the deterioration has occurred and a deterioration case.

15. The charging control apparatus of claim 14, wherein the sensor scale optimizer adjusts the scale of the current sensor upward or downward based on the identified deterioration case.

16. The charging control apparatus of claim 14, wherein two IGBTs are included for each phase, and the predetermined reference value is applied differently to the two IGBTs.

17. The charging control apparatus of claim 16, wherein the predetermined reference values for the two IGBTs have different signs depending on the deterioration case.

18. The charging control apparatus of claim 14, wherein the predetermined reference value is determined in consideration of at least one of a load condition, a temperature sensor position deviation, a temperature sensing error, or a current sensor sensing error.

19. The charging control apparatus of claim 14, wherein the sensor scale optimizer adjusts the scale of the current sensor with respect to a phase corresponding to the current sensor in which the deterioration has occurred.

20. The charging control apparatus of claim 14, wherein the charging is maintained by determining that the current sensor is in the normal operation, when the deterioration of the current sensor is not detected.

* * * * *